United States Patent [19]

Mitchell et al.

[11] Patent Number: 4,511,198

[45] Date of Patent: Apr. 16, 1985

[54] POP-UP ELECTRICAL RECEPTACLE UNIT

[75] Inventors: Terry L. Mitchell, Jenison; David H. Hodge, Hopkins, both of Mich.

[73] Assignee: Dunbar Furniture, Inc., Berne, Ind.

[21] Appl. No.: 541,206

[22] Filed: Oct. 12, 1983

[51] Int. Cl.³ .............................................. H01R 13/44
[52] U.S. Cl. ................................... 339/34; 248/409
[58] Field of Search ...................... 339/34; 174/48, 57; 248/409

[56] References Cited

U.S. PATENT DOCUMENTS 493,111  3/1893  Parsons ............................... 248/409
3,794,956  2/1974  Dubreuil ............................. 339/34

Primary Examiner—Neil Abrams
Attorney, Agent, or Firm—Peterson, Wicks, Nemer & Kamrath

[57] ABSTRACT

The pop-up electrical receptacle unit, when mounted in relation to an opening in a desk or table, enables the user to effect a retracted or concealed condition of the receptacle by pressing the receptacle downwardly and then permitting the receptacle to rise slightly by means of a coil spring. Such action rotates a ratchet mechanism into an obstructive relation with a pin carried on an actuator attached to the underside of the receptacle and movable therewith. The user effects a protracted or exposed condition of the receptacle by again depressing and releasing the receptacle so as to rotatively index the ratchet mechanism into an angular relation in which the actuated pin is no longer obstructed, the receptacle then being thrust upwardly by the coil spring into its protracted position in which position the prongs of an electrical plug can be inserted into the elevated receptacle.

17 Claims, 20 Drawing Figures

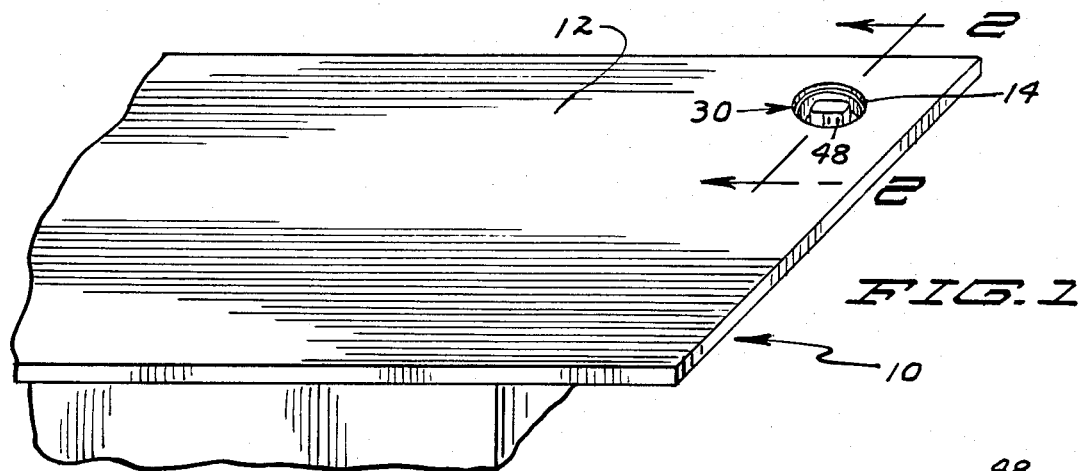
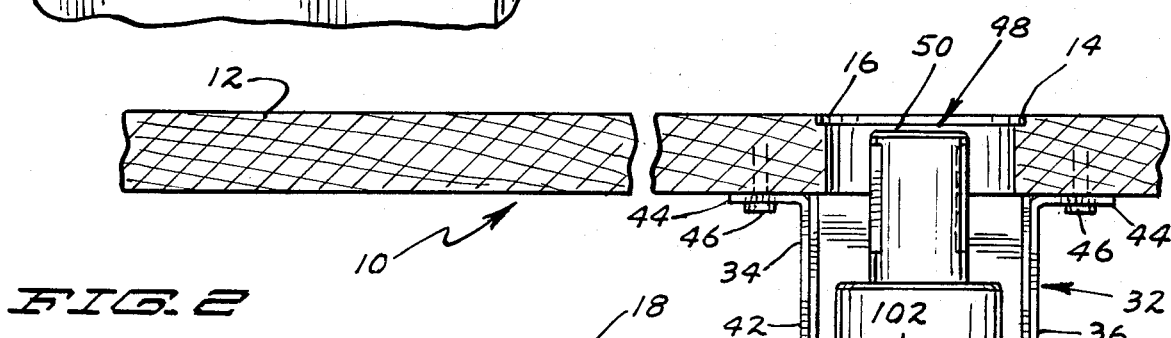
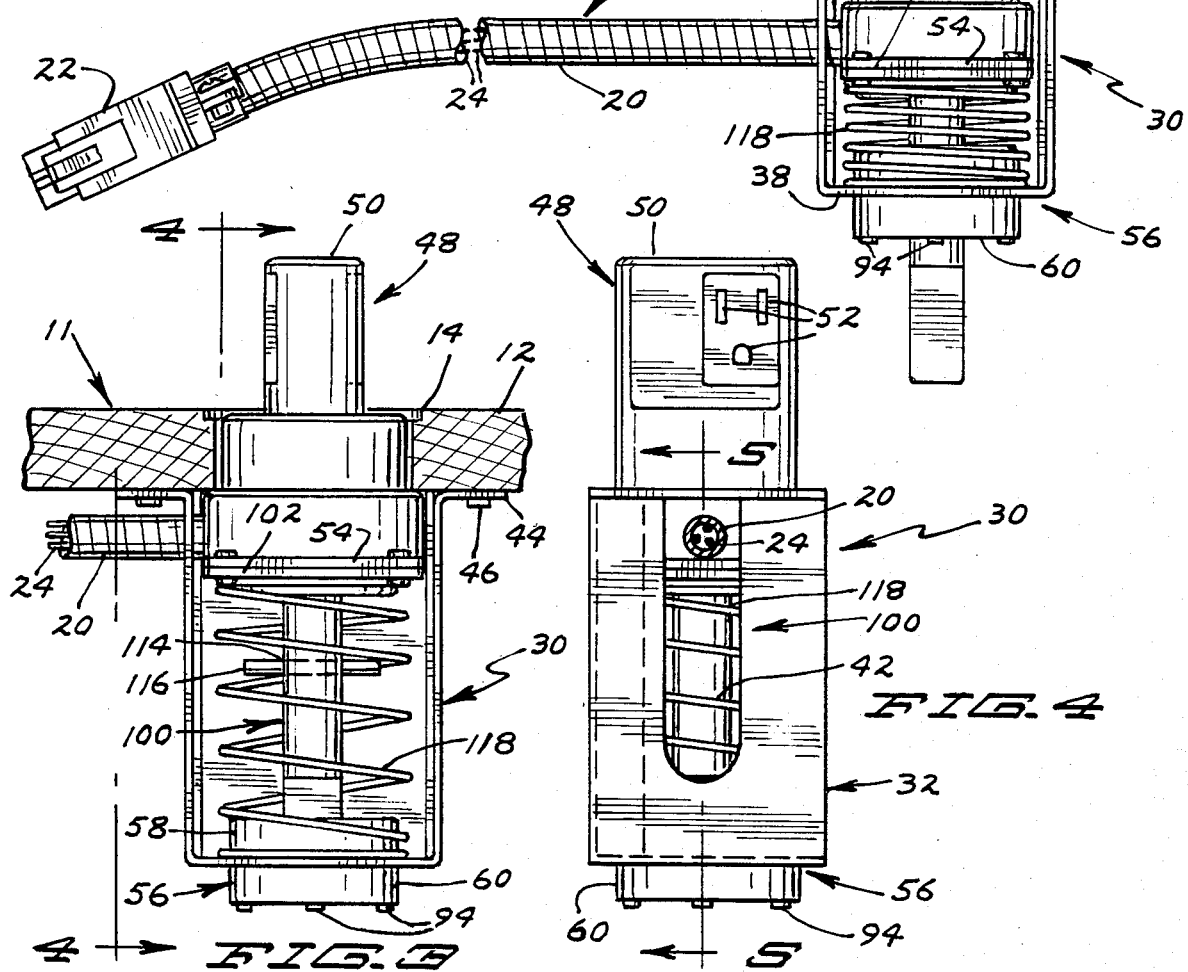

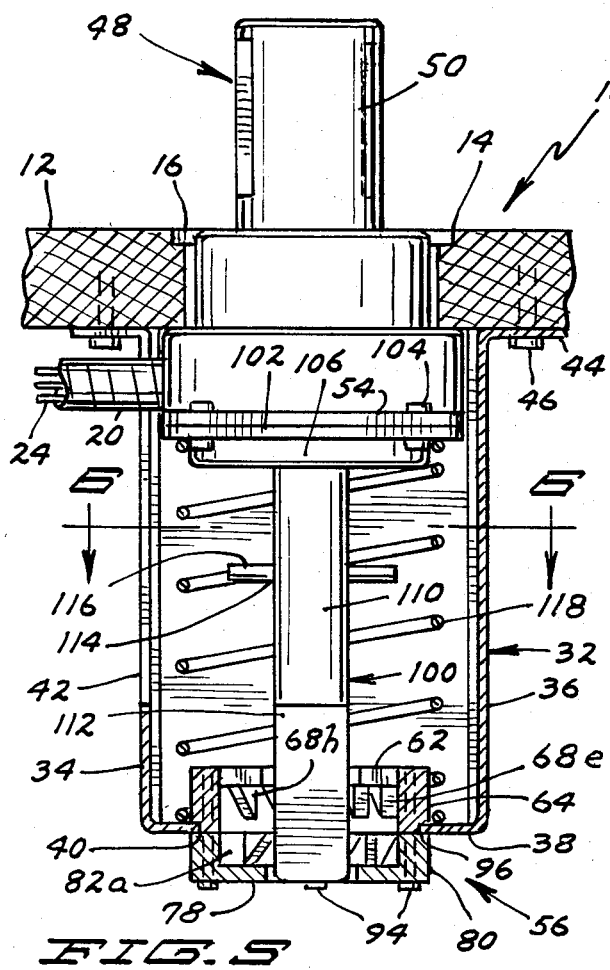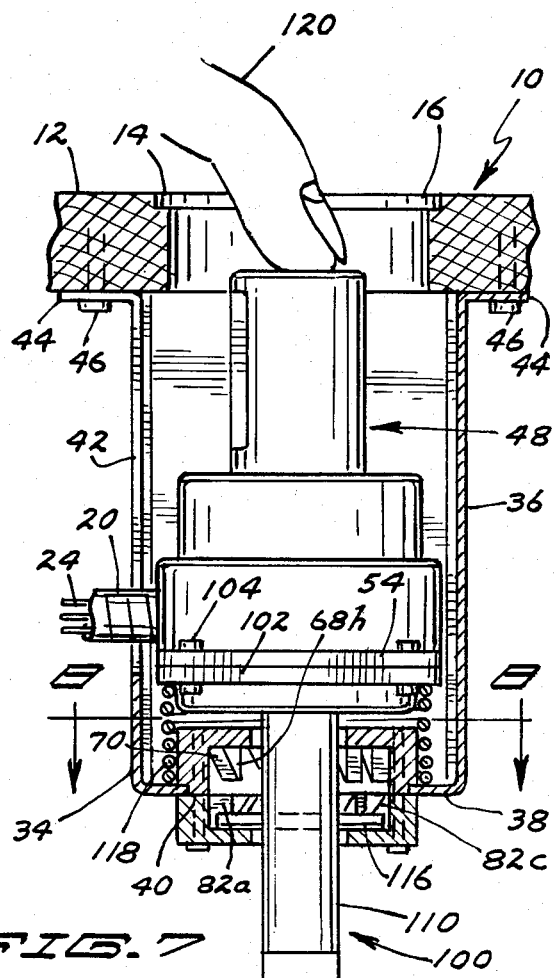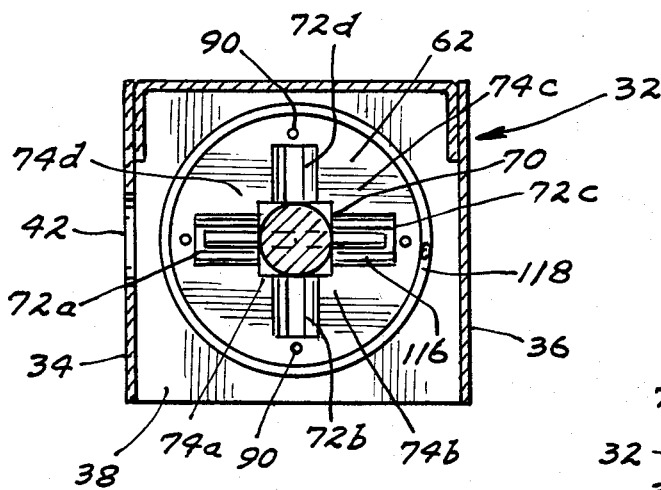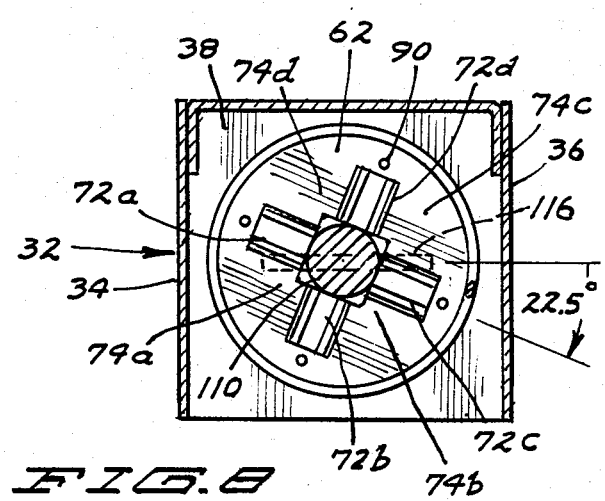

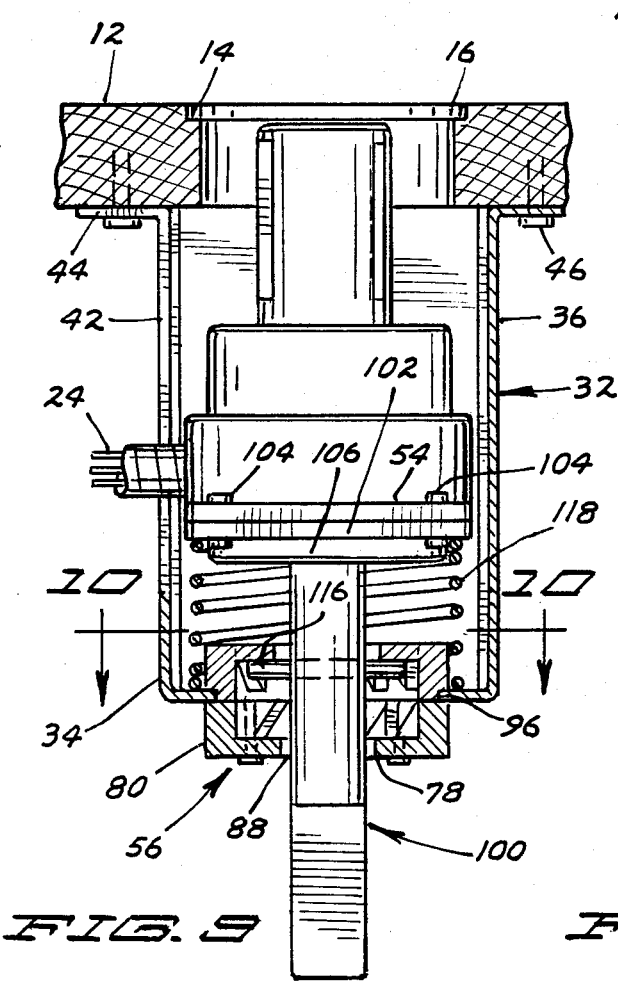
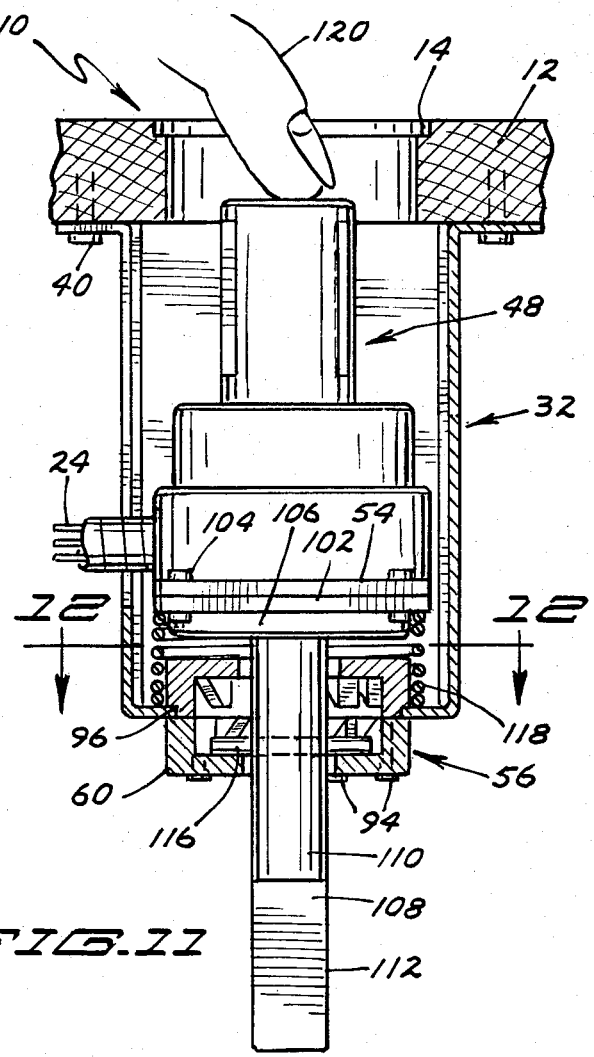
FIG. 9
FIG. 11
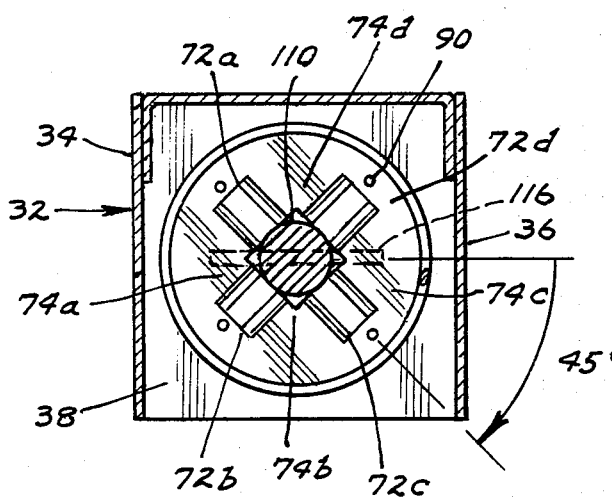
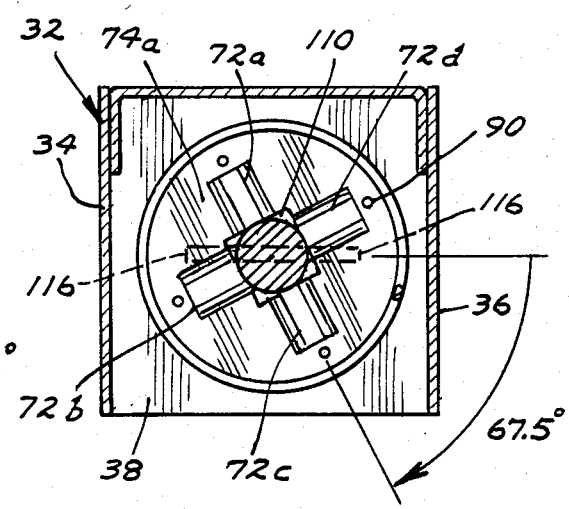
FIG. 10
FIG. 12

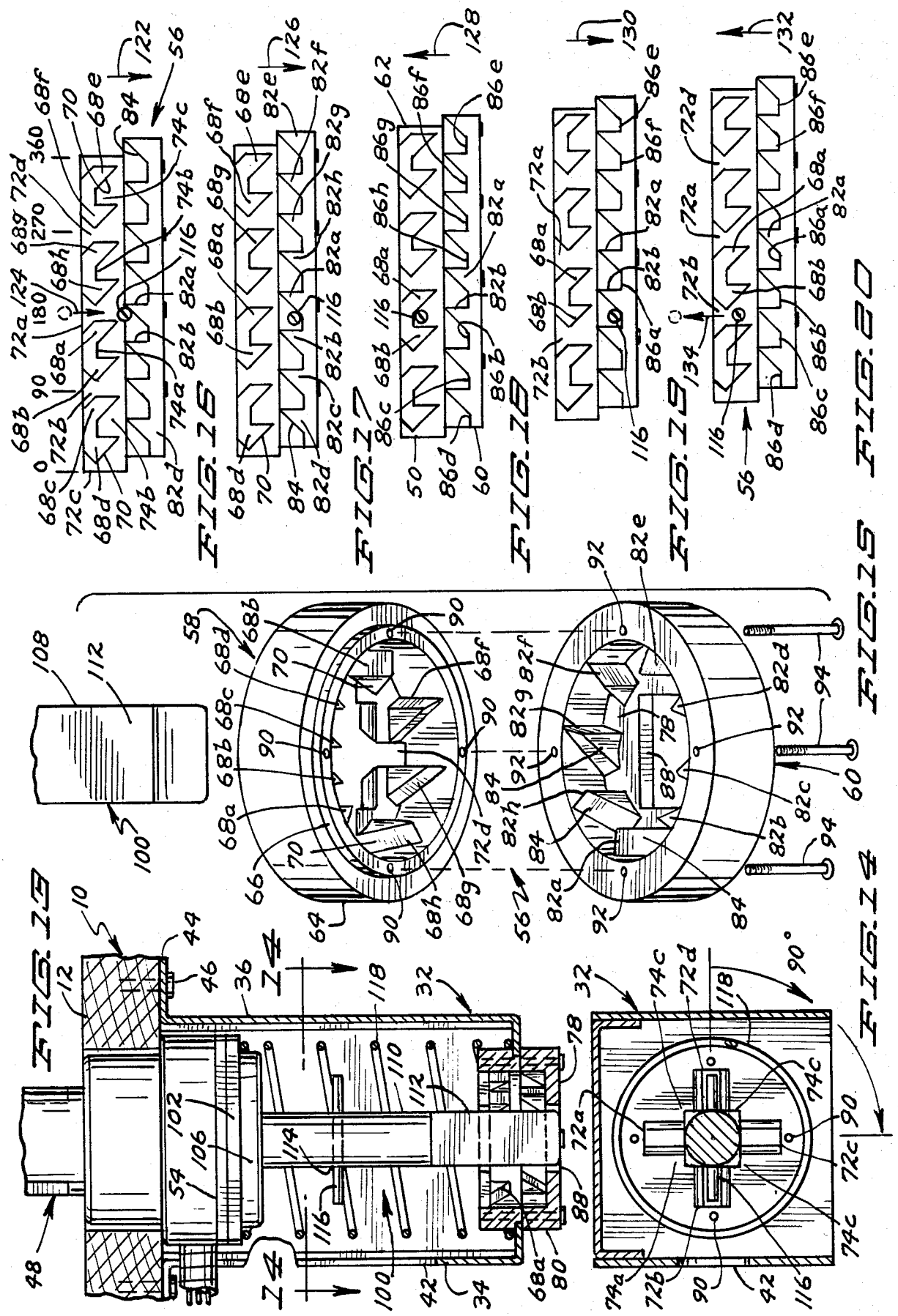

POP-UP ELECTRICAL RECEPTACLE UNIT

BACKGROUND OF THE INVENTION

1. Field of the Invention

This invention relates generally to electrical receptacles, and pertains more particularly to a pop-up electrical receptacle unit for desks, tables and the like.

2. Description of the Prior Art

Modern-day office furniture assumes a variety of shapes and forms. Frequently, it is desirable to supply electric power for the operation of office equipment placed on desks, tables and the like, particularly overhead or slide projectors, dictating/transcribing machines, calculators, typewriters, as well as lamps for supplementing at times overhead lighting. The advent of modular office furniture has complicated the problem of supplying power to such equipment without detracting from the overall appearance of the furniture. For instance, a conference table may very well require an electrical receptacle at times, such as when an overhead or slide projector is to be used, but at other times the entire working surface of the table should be available for note pads, drawings, layouts, mechanical models and other paraphernalia. Similar problems exist with office desks, and even credenzas and cubes. Thus, because of the various types of office furniture currently used, the power supply problem has become of great concern to the designers of office furniture and also to interior decorators faced with the task of providing aesthetically pleasing office plans. Hence, there is a competitive challenge to provide furniture that is not only practical as far as being able to operate various electrical devices placed thereon, but it is important that the furniture be attractive, as well.

In the not too distant past, just extension cords were employed for supplying office equipment with electric power when placed on the working surfaces of office furniture. This is still done in many instances, resulting in an unsightly appearance.

Attempts have been made to modify the furniture itself so that electric power can be supplied via appropriate conductors and connections incorporated directly into the furniture. In this regard, U.S. Pat. No. 1,786,823, issued on Dec. 30, 1930 to Carrington et al for "DESK" makes use of a channel member that is a permanent part of the desk structure. The channel is unsightly and is not suitable for use with a conference table, for instance.

Another patent involving a desk that is structurally modified is U.S. Pat. No. 4,163,867, granted on Aug. 7, 1979 to James H. Breidenbach for "WIRING ACCESS SYSTEM FOR DESK AND THE LIKE". In this instance, what is termed an edge trim piece is releasably attached at the rear of the desk top, thereby permitting the wiring to be brought up from an interior location within the desk to the working surface thereof.

Another situation involves an elongated tubular enclosure that is attached to the rear edge of the desk top. This is a slotted arrangement so that various types of wires can be brought out through a slot onto the desk top. Such an arrangement is described in U.S. Pat. No. 4,094,561, granted on June 13, 1978 to Wolff et al for "WIRING ENCLOSURE FOR DESK".

The foregoing are but examples of a number of attempts that have been resorted to in an effort to supply power to electrical equipment placed on office desks. The common shortcomings of such arrangements center around the rather extensive modification of the office furniture, the adding of a rather complicated and costly wiring system and the concomitant unsightliness. While various attempts have been made to improve the appearance of the office furniture, as far as its electric power supplying capability is concerned, a need still exists for a simple system for adequately supplying electric power to various types of office furniture and the various types of office equipment placed thereon.

SUMMARY OF THE INVENTION

Accordingly, one object of our invention is to provide means for supplying electric power to the working surfaces of various types of furniture, especially office desks and conference tables, that will not detract from the appearance of the furniture. More specifically, an aim of the invention is to provide an electrical receptacle that can be manually pressed downwardly so that the top thereof is virtually just beneath the working surface of the furniture, yet readily elevated so that receptacle extends sufficiently above the working surface to enable a conventional electrical plug to be inserted therein.

Another object of the invention is to provide a pop-up electrical receptacle unit that can be easily installed, more readily at the factory or where the furniture is located if already sold.

Still further, the invention has for an object the provision of a pop-up electrical receptacle unit that will be inexpensive and rugged, as well as easily manipulated between an inconspicuous position when not needed and a projected position for easy use.

Yet another object of the invention is to provide a pop-up electrical receptacle unit in which the cable containing the wires or conductors therein is fixedly attached to the receptacle and movable therewith, thereby avoiding any use of sliding contacts.

Briefly, our invention envisages the use of a circular opening in the top of the furniture to be provided with our pop-up electrical receptacle unit. The receptacle is vertically movable upwardly through the circular opening, there being a spring that advances the receptacle from a lowered and concealed position to a projected or upwardly extending position. A ratchet mechanism retains the receptacle in its lowered or concealed position, such a position being readily achieved by manually pushing down on the receptacle. In other words, the ratchet mechanism provides a latching condition that retains the receptacle in its depressed position. In this regard the user depresses the receptacle once to latch the receptacle in its lower position and depresses the receptacle once again to release the receptacle so that it then moves upwardly by spring action. Thus, the receptacle is constrained for rectilinear movement between a lower position in which the entire receptacle is concealed beneath the furniture's working surface and an upper position in which the receptacle projects above the working surface of the furniture so as to be available for receiving therein the bayonets or prongs of a conventional electrical plug.

BRIEF DESCRIPTION OF THE DRAWINGS

FIG. 1 is a perspective view of a portion of a desk or table with our pop-up electrical receptacle unit installed, the view depicting the receptacle in its lowered or retracted position;

FIG. 2 is an enlarged sectional view taken in the direction of line 2—2 of FIG. 1;

FIG. 3 is a fragmentary view corresponding to FIG. 2 but with the receptacle in its elevated or usable position;

FIG. 4 is a side elevational view taken in the direction of line 4—4 of FIG. 3;

FIG. 5 is a vertical sectional view taken in the direction of line 5—5 of FIG. 4;

FIG. 6 is a horizontal sectional view taken in the direction of line 6—6 of FIG. 5;

FIG. 7 is a vertical sectional view corresponding to FIG. 5, but with the receptacle being depressed by a person's finger;

FIG. 8 is a sectional view taken in the direction of line 8—8 of FIG. 7, the view showing the incremental rotation of the ratchet mechanism that occurs;

FIG. 9 is a vertical sectional view depicting the receptacle in its retracted position;

FIG. 10 is a horizontal sectional view taken in the direction of line 10—10 of FIG. 9, the view showing the obstructive relation between parts that retain the receptacle in its retracted position;

FIG. 11 is a sectional view showing a person's finger pressing downwardly on the receptacle to initiate a release thereof from its retracted position;

FIG. 12 is a horizontal sectional view taken in the direction of line 12—12 of FIG. 11 to show the additional rotation of the ratchet mechanism that occurs by virtue of the finger pressure exerted in FIG. 11;

FIG. 13 is another sectional view, this figure illustrating the receptacle in its elevated or protracted position, the position being realized by spring action after the person has removed his finger, as shown in FIG. 11;

FIG. 14 is a sectional view taken in the direction of line 14—14 of FIG. 13, the view showing the ratchet mechanism rotated sufficiently so as to permit the raising of the receptacle into the protracted position of FIG. 13;

FIG. 15 is an "open face" exploded perspective view of the two halves comprising the ratchet mechanism;

FIG. 16 is a developed or flat view of the ratchet mechanism, the depicted relationship corresponding generally to that of FIGS. 5 and 6;

FIG. 17 is another developed view of the ratchet mechanism, the view in this instance corresponding generally to FIGS. 7 and 8;

FIG. 18 is still another developed view of the ratchet mechanism, the view corresponding generally to FIGS. 9 and 10;

FIG. 19 likewise depicts a developed view of the ratchet mechanism, the relationship in this situation corresponding generally to that of FIGS. 11 and 12, and FIG. 20 is still another developed view of the ratchet mechanism, this view illustrating the latch pin at the moment of its release and the start of its upward travel to the position pictured in FIGS. 13 and 14.

DESCRIPTION OF THE PREFERRED EMBODIMENT

Referring first to FIG. 1, it will be observed that a portion of a desk 10 has been pictured, the desk 10 having a working surface labeled 12 which contains therein a circular opening 14. Preferably, the opening 14 is formed with a recessed annular shoulder 16 so that a thin closure disk (not shown) can be placed thereon, such a disk, when used, providing an uninterrupted working surface 12.

It will be appreciated, as the description progresses, that while a desk 10 has been depicted, out invention will find usefulness with a variety of different types of furniture. For instance, a conference table could very well be provided with a circular opening therein. Likewise, modular furniture frequently will comprise a number of so-called cubes, sometimes forming a credenza. Here again, a circular opening can be provided in whatever flat surface is associated with any such furniture, thereby permitting use of our invention. It is even contemplated that our invention will possess even greater utility than when used in conjunction with furniture, whether for the office or home, in that it can be employed wherever an electrical receptacle should at times be retracted into an inconspicuous position.

As can be seen in FIG. 2, a wiring assembly denoted generally by the reference numeral 18 is illustrated. The wiring assembly 18 includes an armored cable 20 having a suitable connector 22 at the free end thereof. The connector 22, it will be appreciated, is intended to be mated with another connector so that electric power can be supplied to the wiring assembly 18. In this regard, the armored cable 20 contains therein a trio of wires or conductors 24, two being "hot" and the other being a "ground" one.

The pop-up receptacle unit exemplifying our invention has been denoted generally by the reference numeral 30. Included in the receptacle unit 30 is a U-shaped bracket 32 having parallel vertical legs 34, 36 and a horizontal bight portion 38 bridging the lower ends of the legs 34, 36. The bight portion 38 has a circular hole 40 therein for a purpose better reserved for subsequent explanation. The leg 34 is formed with a vertical slot 42 which has a width sufficient to slidably accommodate the armored cable 20 therein. Outturned mounting flanges or tabs 44 are provided at the upper ends of the legs 34, 36, each flange 44 having at least one hole therein so that screws 46 can be inserted upwardly therethrough and threaded into the underside of the top of the desk 10.

Attention is directed at this time to a conventional receptacle 48 comprised of a dielectric housing 50 having three openings 52 at each side thereof, the openings 52 in only one side being visible (see FIG. 4). As indicated the receptacle 48 can be of conventional construction. In this regard, the openings 52 are of a size to receive therein the bayonets or prongs of a conventional plug (not shown). All that really need be appreciated is that the openings 52 permit insertion of the prongs therethrough so as to engage contacts contained internally within the housing 50. It will be appreciated that the internally disposed contacts are connected to the ends of the earlier-mentioned wires 24. It will be observed that the housing 50 has a bottom face plate 54 that will be referred to again.

Playing an important role in the practicing of our invention is a ratchet mechanism indicated generally by the reference numeral 56. The ratchet mechanism 56 includes an upper cup-shaped half 58 and a lower cup-shaped half 60. The upper half 58 includes a disk or panel portion 62 and a downwardly depending cylindrical skirt or sleeve portion 64, the skirt or sleeve portion 64 having thereon an annular shoulder or ring 66.

Formed integrally on the disk or panel portion 62 of the upper cup-shaped half 58 is a series of peripherally spaced teeth 68a, 68b, 68c, 68d, 68e, 68f, 68g and 68h, each being formed with a sloping or angled cam surface 70.

As perhaps best seen in FIGS. 6 and 14, the disk 62 is also formed with quadrantly located slots 72a, 72b, 72c and 72d. More specifically, the slot 72a is located between the teeth 68a and 68h, the slot 72b between the teeth 68b and 68c, the slot 72c between the teeth 68d and 68e and the slot 72d between the teeth 68f and 68g. Also, it should be noted that there are obstructive regions or areas 74a, 74b, 74c and 74d. In this instance, the obstructive region 74a is between the teeth 68a and 68b, the region 74b between the teeth 68c and 68d, the region 74c between the teeth 68e and 68f, whereas the remaining obstructive region 74d resides between the teeth 68g and 68h. The disk 62 is additionally formed with a centrally located opening 76 having a square configuration.

Describing now the lower cup-shaped ratchet half 60, it will be perceived that it includes a disk or panel portion 78 having an upwardly extending skirt or sleeve portion 80. In this situation, there is also a series of peripherally spaced teeth 82a, 82b, 82c, 82d, 82e, 82f, 82g and 82h, each being formed with a sloping or angled cam surface 84. Unlike the disk or panel portion 62 of the upper cup-shaped half 58, which possesses the quadrantly located slots 72a, 72b, 72c and 72d, the disk or panel portion 78 belonging to the lower cup-shaped half 60 has only the regions 86a, 86b, 86c, 86d, 86e, 86f, 86g and 86h which resemble somewhat the regions 74a, 74b, 74c and 74d of the disk or panel portion 62. There is a central opening 88 in the disk 78, the opening 88 having a square configuration corresponding to that of the central opening 76 in the disk or panel portion 62.

The two ratchet halves 58 and 60 are secured or fastened together to form the ratchet mechanism 56. It is to be observed that the annular shoulder or ring 66 of the upper ratchet half 58 has four tapped holes 90. Aligned with the four holes 90 are four untapped holes 92 extending upwardly through the skirt or sleeve portion 80 of the lower ratchet half 60. Through the agency of four screws 94, the screws 94 being of sufficient length to pass completely through the untapped holes 92, extend upwardly into the four tapped holes 90. In this way, the two halves 58, 60 are secured together, as mentioned above. It should be noted that when the two halves 58 and 60 are mechanically connected together, as just described, a groove is formed at 96 by reason of the presence of the annular shoulder or ring 66. The previously mentioned circular opening 40 in the horizontal bight portion 38 of the U-shaped bracket 32 is of a diameter so that an annular or marginal section of the bright 38 circumjacent the opening 40 extends into the groove 96 and thus serves as a bearing for the ratchet mechanism 56. Stated more succinctly, the ratchet mechanism 56 is mounted for rotation about a vertical axis extending through the center of the circular opening 40.

At this point, reference will be made to a ratchet actuator indicated generally by the reference numeral 100. At the outset it will be explained that the ratchet actuator 100 is intended to move rectilinearly in unison with the receptacle 48. In furtherance of this aim, the actuator has a square plate 102 of the same dimensions as the face plate 54 at the bottom of the receptacle housing 50. By means of rivets 104, the two plates 54, 102 are permanently secured together so that the receptacle 48 is constrained for rectilinear movement in a vertical direction, either down or up. More specifically, the two square plates 54, 102 are guided in a rectilinear path by virtue of the parallel legs 34 and 36 of the U-shaped bracket 32, the legs 34, 36 being spaced apart only a little more than the edge-to-edge dimension or width of the plates 54, 102. For a purpose presently to be explained, the plate 102 is recessesed downwardly to form a circular boss portion 106.

Integral with the square plate 102, more specifically the boss portion 106 thereof, is a stem or plunger 108. The plunger 108 has an upper portion 110 having a cylindrical cross section and a lower portion 112 having a square cross section. The lower square cross section portion 112 extends downwardly through the previously mentioned square openings 76 and 88 formed in the ratchet halves 58 and 60. In this way, the square openings 76 and 88, by reason of their relatively close fit with respect to the square cross section portion 112, together with the square plates 54 and 102, guide the receptacle 48 in its rectilinear path. The stem or plunger 108, more specifically, its upper cylindrical portion 110, has a passage or drilled hole 104 at 114 extending diametrically therethrough. A transverse pin 116 is press-fitted into the passage or hole 114. The purpose of the pin 116 will soon become manifest.

It will be observed that a coil spring 118 is of a diameter so as to receive therein the downwardly protruding boss 106 on the plate 102. In this way, the upper end of the coil spring 118 is prevented from shifting. Also, the lower end of the spring 118 circumscribes the upper half 58 of the ratchet mechanism 56, the cup-shaped half 58 having an appropriately correlated outer diameter so as to be received in the lower end of the coil spring 118.

It will be appreciated that the coil spring 118 biases or urges the receptacle 48 upwardly so as to assume an elevated or protracted position with respect to the working surface 12 of the desk 10; this projected position appears in FIGS. 3, 4, 5 and 13 (although the upper portion of the receptacle 48 has been broken away in FIG. 13 because of space limitations). It is the function of the ratchet mechanism 56, as will become clear hereinafter, to latch or retain the receptacle 48 in its lowered or retracted position; this retracted position appears in FIGS. 1, 2 and 9.

OPERATION

The manner of operating the pop-up receptacle unit 30 will now be presented and should further demonstrate the benefits to be derived from our invention. Although the receptacle unit 30 is held in its retracted position in FIGS. 1 and 2, it will be somewhat easier to describe the operation by considering the receptacle unit 30 to be in its raised or protracted position, this position appearing in FIGS. 3-5 and constituting the position in which it is actually used. It will be remembered that it is when the receptacle 48 projects above the working surface 12 that it is available for accommodating a conventional bayonet-type plug. It is when it is in its lower or retracted position, as in FIGS. 1 and 2, that it is out of sight, rendering the entire working surface of the desk 10 available for the emplacement of miscellaneous items thereon.

Although it will be better understood as the operational description progresses, it will be stated at the outset that whenever the receptacle 48 is in its elevated or raised position, then the pin 116 is aligned with the slots 66a, 66c or 66b, 66d, as the case may be. From FIG. 6 it will be seen that the pin 116 is in registry, although above the slots 72a and 72c. Hence, when the user wishes to have the receptacle 48 concealed and out of the way, that is, retracted beneath the working surface 12 of the desk 10, he simply presses the receptacle 48 with his finger 120 downwardly. Such action can be physically observed by comparing FIGS. 5 and 7. The initial downward movement is schematically portrayed in FIG. 16. The downward movement of the receptacle 48, of course, causes the ratchet actuator 100 to move downwardly inasmuch as the two are joined together by the rivets 104 and thus move in unison. The downward movement of the actuator 100 is indicated by the directional arrow 122 in FIG. 16. The movement of the transverse pin 116 is denoted by another arrow 124.

As the receptacle 48 is pushed downwardly by the person's finger 120, the pin 116 moves, as indicated by the arrow 124 in FIG. 16, so as to engage the tooth 82a, more specifically its sloping or angled cam surface 84, all as pictured in FIG. 16. Inasmuch as the pin 116 extends diametrically from the opposite sides of the cylindrical portion 110, it follows that the particular ratchet tooth 82e is also engaged, being directly opposite the tooth 82a on the disk or panel portion 78 of the lower cup-shaped member or half 60. The initial contact of the pin 116 with the teeth 82a and 82e does not cause any movement of the ratchet half 60, and actually the entire ratchet mechanism 56 in that the lower half 60 is connected to the upper half 58 by means of the screws 46.

Recapitulating, FIGS. 7, 8, and also FIG. 17, visually indicate what occurs when the person continues to press downwardly on the top of the receptacle 48. It will be well to indicate by the arrow 126 in FIG. 17 the downward motion of the pin 116. It should be borne in mind that the pin 116, owing to it being mounted on the stem or plunger 108, is forced against the sloping or angled cam surfaces 84 belonging to the teeth 82a and 82e. Close comparison of FIGS. 16 and 17 will reveal that the cam action derived from the forced downward travel of the pin 116 causes the tooth 82a (and also the tooth 82e) to be shifted. Since the tooth 82a (and the tooth 82e) is integral with the disk or panel portion 78 of the lower ratchet 60, and also since the lower half 60 is secured to the upper half 58 by means of the four screws 46, the entire ratchet mechanism 56 is shifted to the right in FIG. 17 from the position shown in FIG. 16. From FIG. 8, it will be seen that this action produces an initial rotation of the ratchet mechanism 56 through an angle of 22.5°.

When the person removes his finger 120 from the position of the receptacle 48 shown in FIG. 7, then the coil spring 118 is instrumental in immediately moving the receptacle 48 upwardly from the position shown in FIG. 7 to that depicted in FIG. 9. The upward motion of the actuator 100 has been indicated by the arrow 128 in FIG. 18. What occurs, is that the tooth 68a is now acted upon by the pin 116 as it moves upwardly; the tooth 68e is simultaneously acted on by the other end of the pin 116, it will be recognized. It must be remembered that the teeth 68a-68h are each offset with respect to the teeth 82a-82h. Consequently, the pin 116, as it moves upwardly, forces the tooth 68a to the right as viewed in FIG. 18. This action is again translated into an additional incremental rotation of the ratchet mechanism 56, as can be appreciated from FIG. 10. In other words, the ratchet mechanism 56 is first rotated through 22.5° when the receptacle 48 is pressed downwardly and is rotated through an additional 22.5° when the receptacle 48 is permitted to move upwardly under the influence of the coil spring 118.

It is imperative to take into account that the transverse pin 116, when it reaches the angular position shown in FIG. 10, is in an obstructed or interfering relationship with the particular regions 74a, 74c of the disk or panel portion 62 belonging to the upper ratchet half 58. Owing to the obstructive engagement between the pin 116 and the regions 74a, 74c, the receptacle 48 is held or retained in its retracted position. This is the condition shown in FIGS. 1, 2 and 9. Schematically, the condition is also shown in FIG. 18, for the end of the pin 116 thereshown in engagement with the particular region 74a.

Assuming now that the user wishes to elevate the receptacle 48, he then again presses downwardly on the top of the receptacle 48 with his finger 120. As can be seen in FIG. 11, the receptacle 48 has been manually pressed downwardly. Inasmuch as the pin 116 is carried by the plunger 108 of the actuator 100, it moves downwardly. However, it does not at this time engage the tooth 82a (or the tooth 82e), instead engaging the next tooth 82b, more specifically its sloping or angled cam surface 84, as clearly evident in FIG. 19. The downward movement of the actuator 100 is indicated by the arrow 130 in FIG. 19. Whereas the engagement of the pin 116 with the tooth 82b in FIG. 19 moves the lower ratchet half 60 to the right, and also the upper ratchet half 58 in the same direction because the two are fastened together by means of the screws 46. Actually, the ratchet 56 is, in this manner, rotated through another 22.5°, this angular rotation being pictorially presented in FIG. 12.

It is when the receptacle 48 is permitted to rise by the person removing his finger 120 from the housing 50 that the actuator 100 moves upwardly in unison with the receptacle 48. This causes the pin 116 to ride against the sloping or angled cam surface 70 of the tooth 68b, and also against the oppositely located tooth 68f. The additional rotation of the ratchet mechanism 56 causes the slots 72b and 72d to move into an overlying registry with the pin 116. When the slots 72b and 72b are aligned with the pin 116, then the pin 116 is free to move upwardly by virtue of the expanding action of the coil spring 118. In other words, there is no longer any obstructive interference of the pin 116 which prevents the actuator 100 from rising. Therefore, the receptacle 48 springs upwardly so that the openings 52 therein are above the working surface 12 of the desk 10, as is evident from FIGS. 3 and 4, as well as from FIG. 13, although in FIG. 13 a portion of the receptacle 48 has been removed because of the limited amount of drafting area.

The arrow 132 at the right in FIG. 20 signifies the direction of the actuator 100 and the receptacle 48 attached thereto, whereas the arrow 134 more to the left in this view indicates the upward movement of the transverse pin 116 through the slot 72b.

In summation, it will be appreciated from the description that has been given that the ratchet mechanism 56 is literally indexed in rotative increments by reason of the successive engagement of the pin 116 with first a tooth on the lower ratchet half 60 and then a tooth on the upper ratchet half 58, and so on. Each time, however, that the pin 116 is in registry with either the slots 72a, 72c or the slots 72b, 72d the pin 116 can pass therethrough, either downwardly or upwardly. It is when the pin 116 resides at any location intermediate the slots 72a-72d that there is obstructive interference and the receptacle 48 is held in its retracted or concealed position below the working surface 12 of the desk 10. As earlier herein noted, FIG. 10 shows the ratchet 56 rotated into one interfering position so that the pin 116 is held down and the receptacle 48 thereby retained in its retracted position. It is when either the slots 72a, 72c or 72b, 72d are indexed into registry with the pin 116 that the receptacle 48 is automatically elevated into its protracted position (unless depressed by the person's finger 120).

We claim:

1. A pop-up electrical receptacle unit comprising a receptacle for receiving therein the prongs of an electrical plug, means constraining said receptacle for rectilinear movement between a retracted position and protracted position, spring means for urging said receptacle from its said retracted position into its said protracted position, manually releaseable means for retaining said receptacle in its said retracted position including a rotary ratchet mechanism, an actuator on said receptacle having a pin thereon for alternately shifting said ratchet mechanism into an interfering position relative to said pin to establish said retracted position when said receptacle is moved from its protracted position to its said retracted position and into a non-interfering position when said receptacle is moved from its retracted position rectilinearly against the force of the spring means to cause said pin to shift said ratchet mechanism.

2. A pop-up electrical receptacle unit comprising a bracket adapted at one end to be attached to a furniture item, a receptacle reciprocably mounted on said bracket for receiving therein the prongs of an electrical plug, said bracket constraining said receptacle for rectilinear movement between a retracted position and protracted position, said retracted position resulting in said receptacle projecting a lesser distance beyond said one end of said bracket and said protracted position resulting in said receptacle being projected a greater distance beyond said one end of said bracket, a ratchet mechanism rotatably mounted adjacent the other end of said bracket, said ratchet mechanism including first and second cup-shaped members, each cup-shaped member having a series of annularly disposed angled teeth, the teeth of said first cup-shaped member being angularly offset with respect to the teeth on said second cup-shaped member, said first cup-shaped member having at least one slot located between two adjacent teeth, a plunger connected at one end to said receptacle and extending through said cup-shaped members, a transverse pin carried on said plunger, said pin being of a size to pass through said slot when said slot is angularly in register therewith, whereby manual movement of said receptacle in a direction toward said retracted position causes said pin to enter through said slot and engage at least one tooth on said second cup-shaped member to partially rotate said cup-shaped members in one angular direction, and spring means for urging said plunger in a direction toward said protracted position so that when manual pressure is removed from said receptacle, then said spring means urges said pin in a direction to engage at least one of the teeth on said first cup-shaped member to partially rotate said cup-shaped members farther in said one angular direction and to rotate said slot out of registry with said pin so that said receptacle is retained in its said retracted position.

3. A pop-up electrical receptacle unit in accordance with claim 2 in which said first cup-shaped member has an additional slot, said additional slot being angularly displaced with respect to said first slot, subsequent manual movement of said receptacle causing said pin to engage a second tooth on said second cup-shaped member to partially rotate said cup-shaped members still farther in said one angular direction, release of said receptacle permitting said spring means to urge said plunger in a direction to cause said pin to engage a second tooth on said first cup-shaped member whereby said additional slot is rotated into registry with said pin so that said pin can pass therethrough to allow said receptacle to move into its said protracted position under the influence of said spring means.

4. A pop-up electrical receptacle unit in accordance with claim 3 in which said bracket has a slot, and an armored cable connected to said receptacle, said armored cable extending through said bracket slot and movable longitudinally in said bracket slot when said receptacle is moved from its retracted position into its said protracted position and vice versa.

5. A pop-up electrical receptacle unit in accordance with claim 4 in which said bracket is U-shaped, said U-shaped bracket having a bight formed with a circular opening therein, said cup-shaped members when connected together forming a groove into which the marginal portion of said bight circumjacent said circular opening extends, said U-shaped bracket thereby journaling said cup-shaped members for rotation.

6. A pop-up electrical receptacle unit in accordance with claim 5 in which said U-shaped bracket includes oppositely issuing flanges at its said one end which adapt said bracket for attachment to said furniture item.

7. A pop-up electrical receptacle unit in accordance with claim 6 in which said furniture item constitutes a desk or table having a hole therein so that said receptacle is beneath the working surface of said desk or table when said receptacle is in its said retracted position and said receptacle extends above the working surface of said desk or table when said receptacle is in its said protracted position.

8. A pop-up electrical receptacle unit comprising a receptacle for receiving therein the prongs of an electrical plug, means constraining said receptacle for rectilinear movement between a retracted position and protracted position, spring means for urging said receptacle from its said retracted position into its said protracted position, manually releasable means including a ratchet mechanism for retaining said receptacle in its said retracted position, said ratchet mechanism including first and second disk members, each having a series of teeth thereon successively engageable by said actuating means, and means fastened to said receptacle and movable therewith for actuating said ratchet mechanism.

9. A pop-up electrical receptacle unit in accordance with claim 8 in which said first disk member is nearer said receptacle and said second disk member is farther from said receptacle, the teeth on said first disk having sloping surfaces facing said second disk and the teeth on said second disk having sloping surfaces facing said first disk.

10. A pop-up electrical receptacle unit in accordance with claim 9 in which said actuating means includes a transverse pin for successively engaging the sloping surfaces of said teeth.

11. A pop-up electrical receptacle unit in accordance with claim 10 in which the teeth on said first disk are angularly offset with respect to the teeth on said second disk.

12. A pop-up electrical receptacle unit in accordance with claim 11 in which said first disk includes at least one slot through which said pin passes.

13. A pop-up electrical receptacle unit in accordance with claim 12 in which said disks incrementally rotate in unison each time said pin engages the sloping surface of a tooth.

14. A pop-up electrical receptacle unit in accordance with claim 8 in which said first disk member is nearer said receptacle and said second disk member is farther away from said receptacle, and fastening means maintaining said disk members together as a unit with the teeth of said first disk member being angularly offset from the teeth of said second disk member, manual movement of said receptacle in a direction toward said retracted position causing said actuating means to engage one of the teeth on said second disk member to incrementally rotate said disk members in one angular direction and thus move said disk members into a first rotative position and spring movement of said receptacle in a direction toward said protracted position causing said actuating means to engage one of the teeth on said first disk member to incrementally rotate said disk members further in said one angular direction to move said disk members into a second rotative position.

15. A pop-up electrical receptacle unit in accordance with claim 14 in which said first disk member provides obstructive interference with said actuating means to retain said receptacle in its said retracted position when said disk members are in their said second rotative position.

16. A pop-up electrical receptacle unit in accordance with claim 15 wherein a subsequent manual movement of said receptacle in a direction toward said retractive position causes said actuating means to engage a second of the teeth on said second disk member to incrementally rotate said disk members still farther in said one angular direction to move said disk members into a third rotative position and spring movement of said receptacle in a direction toward said protracted position again incrementally rotating said disk members even farther in said one angular direction to move said disk members into a fourth rotative position to permit said spring means to urge said receptacle into its said retracted position.

17. A pop-up electrical receptacle unit in accordance with claim 16 in which said actuating means includes a transverse pin, said pin engaging said one tooth on said second disk member to incrementally rotate said disk members into said first rotative position, said pin subsequently engaging said one tooth on said first disk member to rotate said disk members into said second rotative position, said pin subsequently engaging said second tooth on said second disk member to rotate said disk members into said third rotative position and said pin engaging said second tooth on said first disk member to move said disk members into said fourth rotative position.

* * * * *

UNITED STATES PATENT OFFICE
CERTIFICATE OF CORRECTION

Patent No. 4,511,198                       Dated  April 16, 1985

Inventor(s)  Terry L. Mitchell, David H. Hodge

It is certified that error appears in the above-identified patent and that said Letters Patent are hereby corrected as shown below:

In column 4, line 2, "out" should be --our--.

In column 5, line 49, "bright" should be --bight--.

In column 8, line 38, the second occurrence of "72b" should be --72d--.

Signed and Sealed this

Twenty-seventh Day of August 1985

[SEAL]

Attest:

DONALD J. QUIGG

Attesting Officer          Acting Commissioner of Patents and Trademarks